(12) United States Patent
Della Flora et al.

(10) Patent No.: US 10,812,003 B2
(45) Date of Patent: Oct. 20, 2020

(54) MOTOR CONTROL SYSTEM AND METHOD

(71) Applicant: Danfoss Power Electronics A/S, Grasten (DK)

(72) Inventors: Leandro Della Flora, Nordborg (DK); Anton Smith, Nordborg (DK)

(73) Assignee: Danfoss Power Electronics A/S, Graasten (DK)

( * ) Notice: Subject to any disclaimer, the term of this patent is extended or adjusted under 35 U.S.C. 154(b) by 0 days.

(21) Appl. No.: 16/312,383

(22) PCT Filed: Jul. 5, 2017

(86) PCT No.: PCT/EP2017/066720
§ 371 (c)(1),
(2) Date: Dec. 21, 2018

(87) PCT Pub. No.: WO2018/007424
PCT Pub. Date: Jan. 11, 2018

(65) Prior Publication Data
US 2019/0238080 A1 Aug. 1, 2019

Related U.S. Application Data

(60) Provisional application No. 62/358,697, filed on Jul. 6, 2016.

(51) Int. Cl.
*H02P 23/14* (2006.01)
*H02P 6/182* (2016.01)
(Continued)

(52) U.S. Cl.
CPC .............. *H02P 23/14* (2013.01); *H02P 1/029* (2013.01); *H02P 6/182* (2013.01); *H02P 27/06* (2013.01)

(58) Field of Classification Search
CPC ...... H02P 1/00; H02P 1/04; H02P 1/46; H02P 1/24; H02P 1/26; H02P 1/423;
(Continued)

(56) References Cited

U.S. PATENT DOCUMENTS 6,281,656 B1 * 8/2001 Masaki ................. B60L 15/025
318/700
9,837,946 B2 * 12/2017 Feng .......................... H02P 6/18
(Continued)

FOREIGN PATENT DOCUMENTS

EP 0994561 A2 4/2000
JP H1175394 A 3/1999
(Continued)

OTHER PUBLICATIONS

International Search Report for PCT Serial No. PCT/EP2017/066720 dated Sep. 26, 2017.

*Primary Examiner* — Antony M Paul
(74) *Attorney, Agent, or Firm* — McCormick, Paulding & Huber PLLC (57) ABSTRACT

A method and apparatus is described in which a series of short-circuiting pulses is applied to a motor. A current in the motor is determined after one or more of the series of short circuit pulses has completed. The duration of the short-circuit pulses is adjusted depending on the determined current. The method and apparatus may be used within an arrangement for catching a spinning motor.

15 Claims, 5 Drawing Sheets

(51) Int. Cl.
*H02P 1/02* (2006.01)
*H02P 27/06* (2006.01)

(58) Field of Classification Search
CPC .... H02P 1/465; H02P 3/00; H02P 3/12; H02P
3/22; H02P 6/00; H02P 6/002; H02P
6/08; H02P 6/12; H02P 6/14; H02P
21/00; H02P 23/00; H02P 25/00; H02P
27/00; H02P 27/04; H02P 23/14
USPC .... 318/400.01, 400.02, 400.14, 400.15, 700,
318/701, 721, 799, 800, 801, 811, 430,
318/432, 599, 299, 400.1, 400.21, 400.22
See application file for complete search history.

(56) References Cited

U.S. PATENT DOCUMENTS

| | | | |
|---|---|---|---|
| 10,295,239 B2* | 5/2019 | West | F04C 18/16 |
| 2016/0365816 A1* | 12/2016 | Feng | H02P 6/18 |

FOREIGN PATENT DOCUMENTS

| | | | | |
|---|---|---|---|---|
| WO | 2015045529 A1 | 4/2015 | | |
| WO | 2015131791 A1 | 9/2015 | | |
| WO | WO-2015131791 A1 * | 9/2015 | | H02P 27/08 |

\* cited by examiner

MOTOR CONTROL SYSTEM AND METHOD

CROSS-REFERENCE TO RELATED APPLICATIONS

This application is a National Stage application of International Patent Application No. PCT/EP2017/066720, filed on Jul. 5, 2017, which claims priority to U.S. Provisional Patent Application No. 62/358,697, filed on Jul. 6, 2016, each of which is hereby incorporated by reference in its entirety.

TECHNICAL FIELD

The present invention relates to a motor control system and method.

BACKGROUND

Adjustable speed drives are known for use in the control of multi-phase electric motors. In some cases, the state of an electric motor being driven by an adjustable speed drive may be unknown. Specifically, the angular position and/or the speed of rotation of a rotor of the motor may be unknown. This can happen for many different reasons. Such a situation can occur, for example, following a short power outage. Alternatively, this situation can arrive when a rotor is already spinning before motor drive control has commenced (i.e. on startup of the motor drive).

Many arrangements are known for determining the state of a spinning motor. However, there remains a need for alternative and improved methods and systems.

The present invention seeks to provide an alternative method to those already available.

SUMMARY

The present invention provides a method comprising: applying a series of short-circuiting pulses in order to repeatedly short-circuit at least some of a plurality of windings of a motor, thereby generating a series of short-circuit current pulses; determining (e.g. by measuring—such as by using one or more current sensors) a current in the motor after one or more (or possibly each) of the series of short circuit pulses has completed; and adjusting the duration of the short-circuiting pulses (i.e. future pulses) depending on the determined current. The adjusting step may be repeated for each short circuit pulse. The method may be used within an algorithm for catching a spinning motor. The duration of the pulses may be controlled such that the pulses are long enough to get a measurable current that can be used later in the algorithm, but short enough to keep the inverter in a discontinuous mode of operation (or to prevent other problems).

The present invention also provides a controller comprising: a first input for receiving information relating to a plurality of short-circuit current pulses from at least some windings of a motor; and a control module configured to determine a current in the motor after one or more (or possibly each) of the series of short-circuit current pulses has completed and to adjust the duration of the (future) short-circuiting pulses depending on the determined current. One or more current sensors may be used to determine the current in the motor. As noted above, the adjusting step may be repeated for each short circuit pulse.

Adjusting the duration of the short-circuiting pulses may comprise increasing the duration of the (future) short-circuiting pulses in the event that the determined current is below a threshold. Alternatively, or in addition, adjusting the duration of the short-circuiting pulses may comprise reducing the duration of the (future) short-circuiting pulses in the event that the determined current is above a threshold.

The invention may further comprise determining a peak current in the motor during a short-circuit pulse and reducing the duration of the (future) short-circuiting pulses in the event that the peak current is above a peak current threshold.

The invention may further comprise determining a DC link voltage of an inverter system driving the motor and reducing the duration of the short-circuiting pulses in the event that the DC link voltage is above a DC link voltage threshold.

The invention may further comprise estimating a frequency of rotation of the motor by identifying peaks of the series of short circuit current pulses and using the identified peaks to estimate said frequency of rotation. A frequency estimator (possibly incorporating a PLL) may be provided that is configured to generate the estimate of the frequency of rotation of the motor.

The present invention also provides a motor drive circuit comprising a controller as set out above and further comprising an inverter under the control of said controller.

The present invention yet further provides a computer program product configured to: receive information relating to a plurality of short-circuit current pulses from at least some windings of a motor; determine a current in the motor after one or more (or possibly each) of the series of short-circuit current pulses has completed; and adjust the duration of the short-circuiting pulses depending on the determined current. The computer program product may be configured to implement the features described above.

The present invention also provides a computer program product comprising: means for receiving information relating to a plurality of short-circuit current pulses from at least some windings of a motor; means for determining a current in the motor after one or more (or possibly each) of the series of short-circuit current pulses has completed; and means for adjusting the duration of the short-circuiting pulses depending on the determined current. The computer program product may be configured to implement the features described above.

BRIEF DESCRIPTION OF THE DRAWINGS

The invention will now be described in further detail with reference to the following schematic drawings, in which.

DETAILED DESCRIPTION

Figure 1:
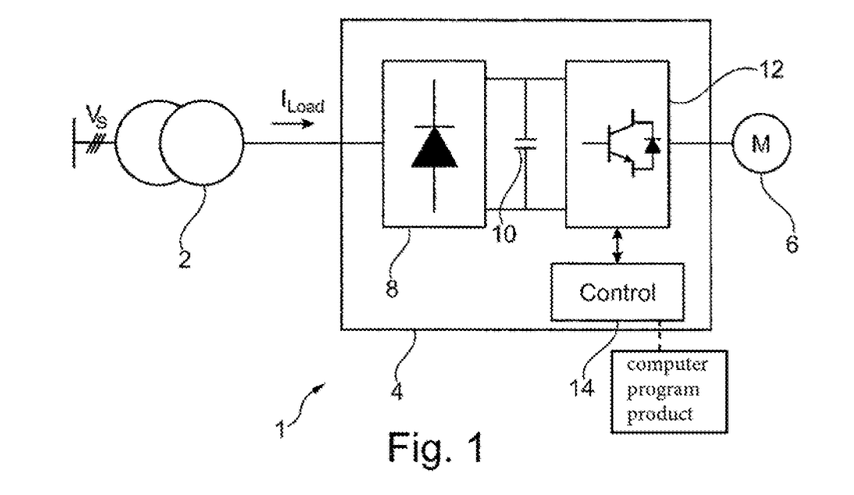
FIG. 1 shows a multi-phase motor drive system.

FIG. 1 is a block diagram of a system, indicated generally by the reference numeral 1, including an adjustable speed drive (ASD). The system 1 comprises an AC power supply 2, an ASD 4 and a load 6 (such as a three-phase motor). The ASD 4 includes a rectifier 8 (often a diode-based rectifier, as shown in FIG. 1, although alternatives, such as advanced front end rectifiers are known), a DC link capacitor 10, an inverter 12 and a control module 14.

The output of the AC power source 2 is connected to the input of the rectifier 8. The output of the rectifier 8 provides DC power to the inverter 12. As described further below, the inverter 12 includes a switching module used to convert the DC voltage into an AC voltage having a frequency and phase dependent on gate control signals. The gate control signals are typically provided by the control module 14. In this way, the frequency and phase of each input to the load 6 can be controlled.

The inverter 12 is typically in two-way communication with the control module 14. The inverter 12 may monitor currents and voltages in each of the three connections to the load 6 (assuming a three-phase load is being driven) and may provide current and voltage data to the control module 14 (although the use of both current and voltage sensors is by no means essential). The control module 14 may make use of the current and/or voltage data (where available) when generating the gate control signals required to operate the load as desired; another arrangement is to estimate the currents from the drawn voltages and the switching patterns—other control arrangements also exist.

Figure 2:
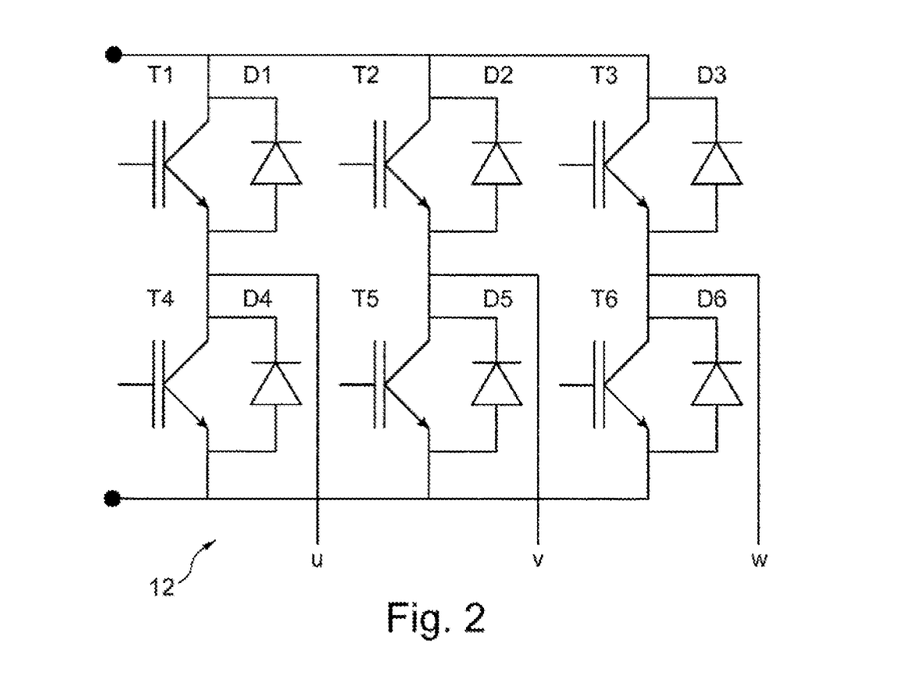
FIG. 2 shows an inverter that may be used in the motor drive system of FIG. 1.

FIG. 2 shows details of an exemplary implementation of the inverter 12.

As shown in FIG. 2, the inverter 12 comprises first, second and third high-sided switching elements (T1, T2 and T3) and first, second and third low-sided switching elements (T4, T5 and T6). Each switching element may, for example, be an insulated-gate bipolar transistor (IGBT) or a MOSFET transistor. As shown in FIG. 2, each of the switching elements (T1 to T6) is associated with a corresponding free-wheeling diode (D1 to D6).

The exemplary inverter 12 is a three-phase inverter generating three outputs: U, V and W. The three phases of the inverter 12 provide inputs to the three-phases of the load 6 in the system 1 described above. Of course, the inverter 12 could be modified to provide a different number of outputs in order to drive a different load (such as a load with more or fewer than three phases).

The first high-sided switching element T1 and the first low-sided switching element T4 are connected together between the positive and negative DC terminals. The mid-point of those switching elements provides the U-phase output. In a similar manner, the second high-sided switching element T2 and the second low-sided switching element T5 are connected together between the positive and negative DC terminals with the mid-point of those switching elements providing the V-phase output. Furthermore, the third high-sided switching element T3 and the third low-sided switching element T6 are connected together between the positive and negative DC terminals with the mid-point of those switching elements providing the W-phase output.

The inverter 12 is a 2-level, 6 transistor inverter. As will be apparent to those skilled in the art, the principles of the present invention are applicable to different inverters, such as 3-level inverters. The description of the inverter 12 is provided by way of example to help illustrate the principles of the present invention.

Figure 3:
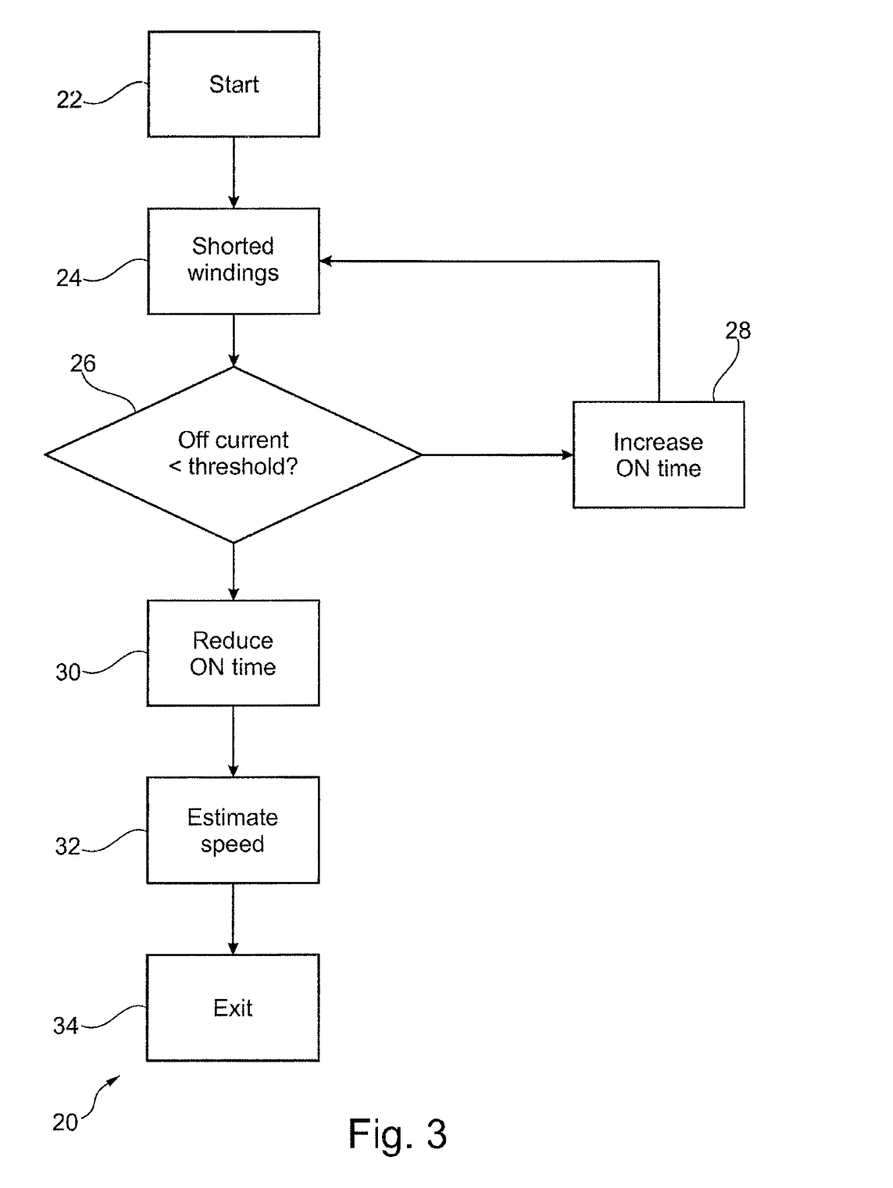
FIG. 3 is a flow chart of an algorithm in accordance with an aspect of the present invention.

FIG. 3 is a flow chart of an algorithm, indicated generally by the reference numeral 20, in accordance with an aspect of the present invention.

The algorithm 20 starts at step 22, during which step, initialization and calibration may occur, if required. The algorithm then moves to shorted windings step (step 24).

At step 24, a number of switches of the inverter 12 are closed for a brief period of time in order to generate short-circuit pulses. In one form of the invention, each of the low-side switching elements (T4, T5 and T6 in the exemplary inverter 12) is closed during the shorted winding step 24.

Figure 4:
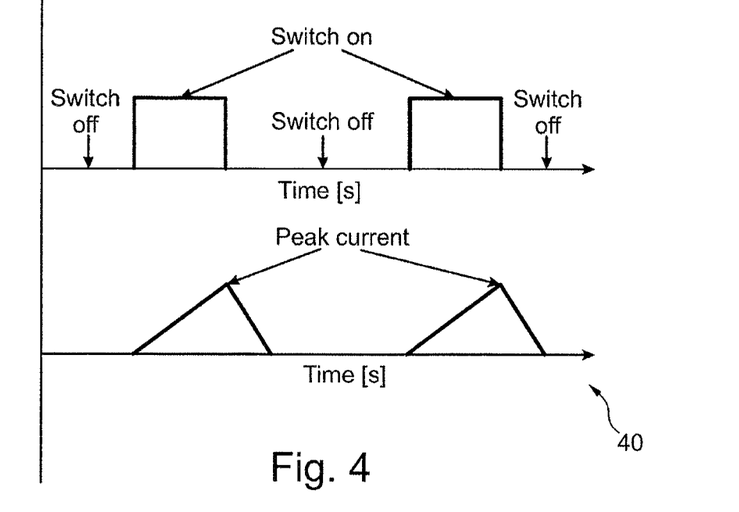
FIG. 4 is a timing diagram demonstrating an aspect of an implementation of the algorithm of FIG. 3.

FIG. 4 is a timing diagram, indicated generally by the reference numeral 40, showing the application of two successive shorting pulses (implemented by two instances of the shorted winding step 24 described above). The upper plot of FIG. 4 shows the application of control signals to the transistors T4, T5 and T6 that implements the short-circuiting of the motor. The lower plot shows the short-circuit current that flows through the motor in response to the shorting pulse.

As shown in FIG. 4, the short-circuit current rises when the transistors T4, T5 and T6 are closed, and decays when those transistors are opened.

At steps 26 to 30, it is determined whether the short-circuit pulse has the appropriate duration and the pulse length is adjusted accordingly. In one form of the invention, the short-circuiting during the step 24 is controlled such that the short-circuiting is long enough to get a measurable current that can be used later in the algorithm, but short enough to keep the inverter in a discontinuous mode of operation.

In the exemplary algorithm 20, step 26 determines whether the current flowing through the motor in the period between successive short-circuit pulses reduces to below a threshold level. This is important because, as described further below, the algorithm involves applying multiple pulses in order to determine the rotor speed and position. If the current flowing through the motor does not reduce sufficiently in between successive short-circuit pulses, then this residual current will tend to increase with each successive short-circuit pulse until the current level is high enough to cause problems (described further below).

The step 26 measures the short-circuit current at or near the "switch off" time shown in FIG. 4. If the short-circuit current is below the desired short-circuit current threshold, then the algorithm 20 moves to step 28 where the length of the short-circuit pulse is increased and the algorithm returns to step 24 where another short-circuit pulse is applied (this time with a longer on time).

If, at step 26, it is determined that the short-circuit current is above the desired short-circuit current threshold, then the algorithm 20 moves to step 30, where the length of the short-circuit pulse is reduced and the algorithm moves to step 32.

At step 32, the motor speed is estimated based on the output of the shorted winding step. This is discussed further below. Once the motor speed has been estimated, the algorithm 20 terminates at step 34.

Figure 5:
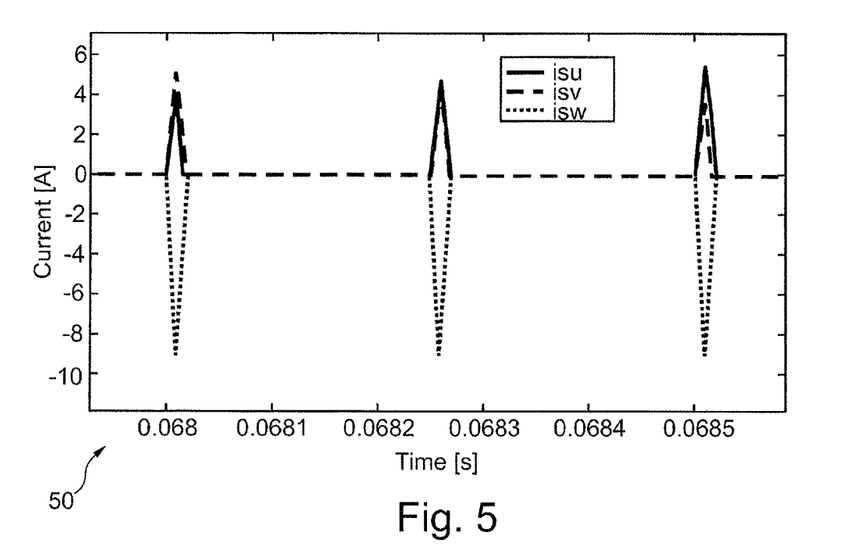
FIG. 5 shows current waveforms on motor windings in accordance with an implementation of the algorithm of FIG. 3.

FIG. 5 is a graph, indicated generally by the reference numeral 50, showing current waveforms on motor windings in response to the short circuiting of the low-side switching elements as described above. FIG. 5 shows three pulses (the u-phase, v-phase and w-phase currents of an exemplary 3-phase motor) and the 3 phase current waveform looks like a set of sawtooth waveforms whose envelope is 3 phase sinusoidal.

Figure 6:
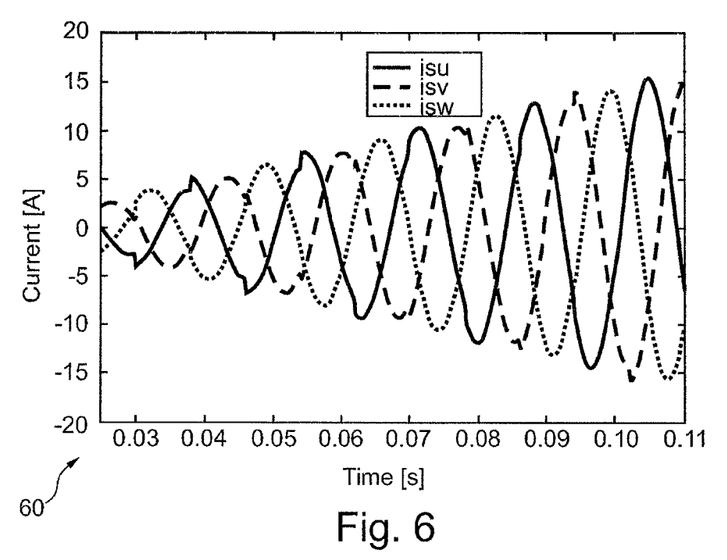
FIG. 6 shows envelopes of current waveforms in accordance with an implementation of the algorithm of FIG. 3.

Taking the peaks of the sawtooth waveform allows for the envelope to be separated and used for frequency estimation. FIG. 6 shows envelopes (indicated generally by the reference numeral 60) of current waveforms in accordance with an aspect of the present invention. The sawtooth waveforms visible in FIG. 5 can be filtered out by sampling the short-circuit currents when the switches are open, thus obtaining the peak of the sawtooth waveform.

Figure 7:
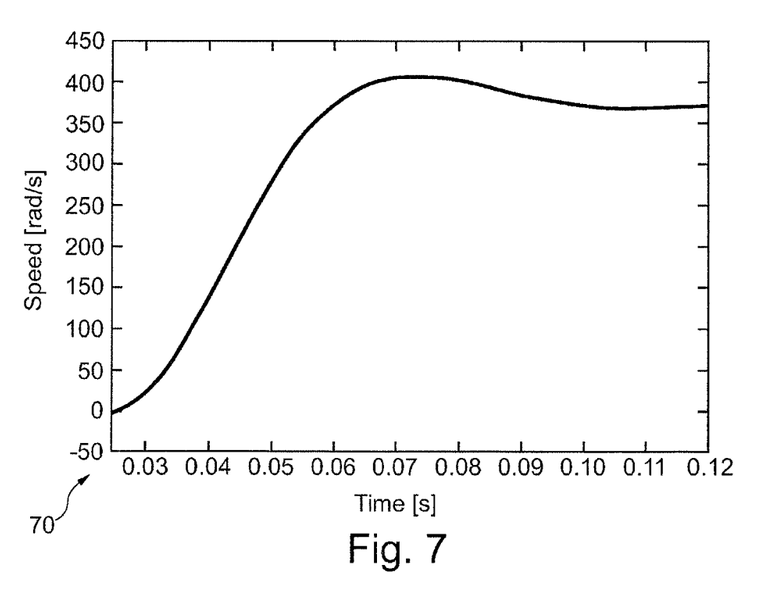
FIG. 7 shows estimated frequency over time in accordance with an aspect of the present invention.

The frequencies of the envelopes shown in FIG. 6 indicate the frequency of rotation of the respective phases of the motor 6. A motor frequency estimation can therefore be based on the envelopes shown in FIG. 6. FIG. 7 is a graph, indicated generally by the reference numeral 70, showing estimated frequency over time in accordance with an aspect of the present invention. The frequency estimation is based on the envelopes shown in FIG. 6 and corresponds to the frequency of rotation of the motor 6. In the example of FIG. 7, the frequency estimate settles at about 325 radians/second.

It should be noted that FIG. 6 shows the current levels of short-circuit current envelopes rising. This is the effect of increasing short-circuit pulse duration in successive iterations of the shorted winding step 24 described above.

Figure 8:
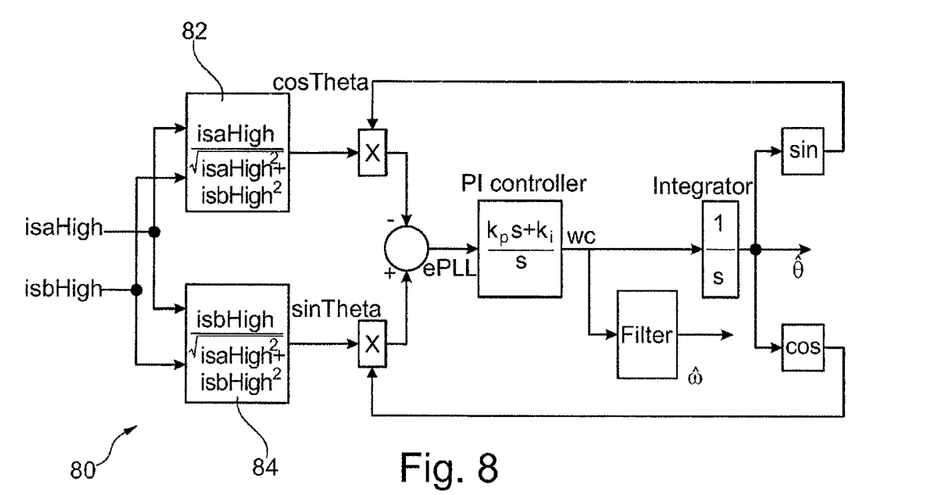
FIG. 8 shows a phase-locked loop circuit in accordance with an aspect of the present invention.

In order to understand the rotation of the motor 6, it may be necessary to determine both the speed and angle of the rotor. The envelopes of FIG. 6 can be used to generate this information. FIG. 8 shows a phase-locked loop circuit, indicated generally by the reference numeral 80, that shows one exemplary method for estimating the rotor speed and angle. The envelopes of FIG. 6 are used as the input of a Phase Lock and Loop, PLL.

The idea behind the PLL is that the sine of the difference between the actual input vector angle θ and its estimate $\hat{\theta}$ can be reduced to zero using a proportional-integral (PI) controller, thus locking the detected phase to the actual angle. The estimated frequency $\hat{\omega}$ is then integrated to obtain the angle $\hat{\theta}$.

As described above, the signals 60 shown in FIG. 6 are 3-phase current signals that represent the envelopes of the current signals detected in the shorted windings step 24 of the algorithm 20. The three-phase current signals 60 are converted into 2-phase signals $i_{saHigh}$ and $i_{sbHigh}$ using a Clarke's transformation. Thus, the signals $i_{saHigh}$ and $i_{sbHigh}$ that are used in the PLL 80 are the Clarke's transform of the peak currents of the sawtooth waveform.

In normal operation, the currents vectors $i_{saHigh}$ and $i_{sbHigh}$ are at right-angles to one another. The angle generated by joining the ends of the currents vectors together defines the vector angle signal θ. By simple mathematics, the cosine and sine of the vector angle θ are given by:

$$\cos(\theta) = \frac{i_{saHigh}}{\sqrt{i_{saHigh}^2 + i_{sbHigh}^2}} \text{ and } \sin(\theta) = \frac{i_{sbHigh}}{\sqrt{i_{saHigh}^2 + i_{sbHigh}^2}}.$$

In the phase locked loop circuit 80, a first function block 82 converts the current vectors $i_{saHigh}$ and $i_{sbHigh}$ into an estimate of cos(θ) using the formula:

$$\cos(\theta) = \frac{i_{saHigh}}{\sqrt{i_{saHigh}^2 + i_{sbHigh}^2}}.$$

Similarly, a second function block 84 converts the current vectors $i_{saHigh}$ and $i_{sbHigh}$ into an estimate of sin(θ) using the formula:

$$\sin(\theta) = \frac{i_{sbHigh}}{\sqrt{i_{saHigh}^2 + i_{sbHigh}^2}}.$$

The PLL 80 generates an estimate of the vector angle. That estimate is denoted by the symbol $\hat{\theta}$.

As shown in FIG. 8, the estimate of cos(θ) is multiplied by the sine of the estimated vector angle to give: cos(θ)sin($\hat{\theta}$). Similarly, the estimate of sin(θ) is multiplied by the cosine of the estimated vector angle to give:

cos(θ)sin($\hat{\theta}$).

An error term is calculated as follows:

$$ePLL = \sin(\theta - \hat{\theta}) = \cos(\theta)\sin(\hat{\theta}) - \sin(\theta)\cos(\hat{\theta}) \tag{1}$$

A PI controller is used such that the error term (ePLL) is forced to zero. In this way, signals for estimated frequency $\hat{\omega}$ and estimated vector angle signal $\hat{\theta}$ are obtained as outputs of the PLL 80.

The method of estimating the speed and angle of the rotor of the motor as described above with reference to FIG. 8 is provided by way of example only. The skilled person will be aware of alternative methods and apparatuses that could be used.

The algorithm 20, described above with reference to FIG. 3, adjusts the short-circuit time of the inverter circuit 12 depending on a current threshold described with reference to FIG. 4. There are, however, a number of other variables that could be used instead or, or in combination with, the short-circuit current threshold.

Figure 9:
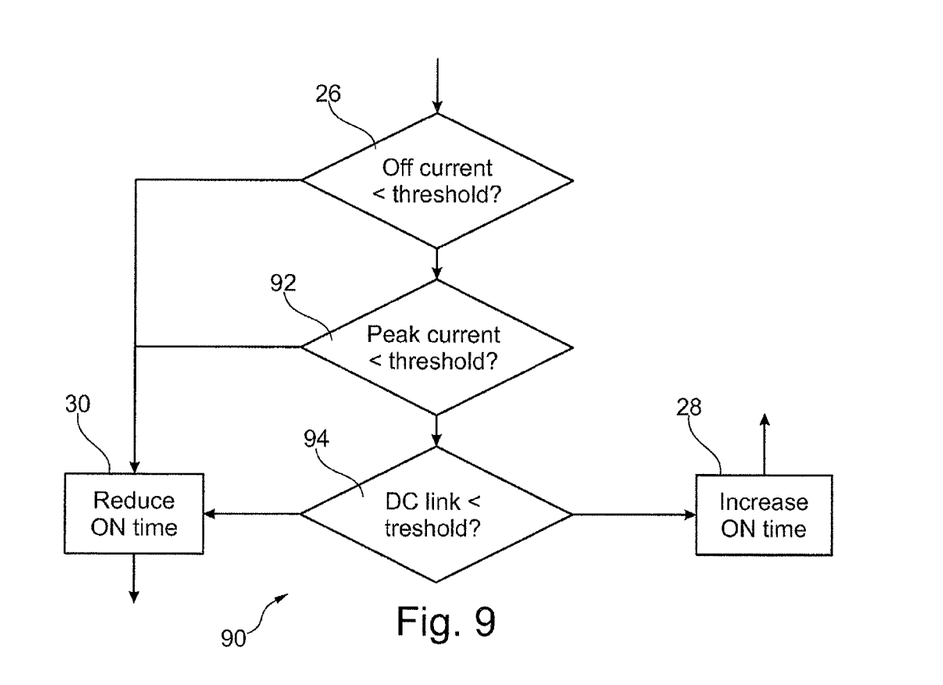
FIG. 9 is a flow chart showing a part of a variant of the algorithm of FIG. 3 in accordance with an aspect of the present invention.

FIG. 9 is a flow chart, indicated generally by the reference numeral 90, showing a part of a variant of the algorithm of FIG. 3 in accordance with an aspect of the present invention.

The algorithm 90 starts at step 26 of the algorithm 20 (i.e. after the shorted winding step 24 of the algorithm 20). As in the algorithm 20, the step 26 determines whether the current flowing through the motor in the period between successive short-circuit pulses reduces to below a threshold level. If, at step 26 of the algorithm 90, it is determined that the short-circuit current is above the desired short-circuit current threshold, then the algorithm 90 moves to step 30, where the length of the short-circuit pulse is reduced and the algorithm moves to step 32. Otherwise, the algorithm 90 moves to step 92.

At step 92, it is determined whether the peak current is above a peak current threshold. As shown in FIG. 4, the peak current is the maximum short-circuit current induced as a result of the short-circuit pulse implemented in step 24. If the peak current is too high (i.e. above a peak current threshold—indicating that the peak current level is higher than intended, which might indicate a problem), then the algorithm moves to step 30 (where the short-circuit current pulse duration is reduced). Otherwise, the algorithm 90 moves to step 94.

At step 94, it is determined whether the DC link voltage of the inverter 12 is above a DC link voltage threshold. This can occur if the voltage stored in the inductive motor is sufficiently large to cause the diodes of the inverter 12 (typically the diodes D1, D2 and D3) to be forward biased, thereby charging the DC link 10 (effectively as a regenerative voltage). If the DC link voltage is too high (i.e. above a DC link voltage threshold), then the algorithm moves to step 30. Otherwise the algorithm 90 moves to step 28.

Thus, the algorithm 90 terminates either by increasing the length of the short-circuit pulse (step 28) before returning to step 24 of algorithm 20 or reducing the length of the short-circuit pulse (step 30) before returning to step 32 of the algorithm 20.

As noted above, the short-circuiting during the step 24 should generally be long enough to get a measurable current that can be used later in the algorithm, but short enough to avoid problems. Three methods for limiting the duration of the short circuit pulse have been described above. Not all of these three arrangements are required in all implementations of the invention and not all implemented methods need necessarily be implemented for every instance of the shorted winding step 24. For example, it would be possible for step 26 to be implemented for ever instance of the shorted winding step 24, but for steps 92 and/or 94 to be implemented less often. In another implementation, some of the steps (such as steps 92 and 94) might be implemented as an interrupt. Moreover, further methods may be applied in addition to, or instead of, one or more of the three arrangements described above.

The embodiments of the invention described above are provided by way of example only. The skilled person will be aware of many modifications, changes and substitutions that could be made without departing from the scope of the present invention. The claims of the present invention are intended to cover all such modifications, changes and substitutions as fall within the spirit and scope of the invention.

What is claimed is:

1. A method comprising:
applying a series of short-circuiting pulses in order to repeatedly short-circuit at least some of a plurality of windings of a motor, thereby generating a series of short-circuit current pulses;
determining a current in the motor after one or more of the series of short circuit pulses has completed; and
adjusting the duration of the short-circuiting pulses depending on the determined current;
wherein adjusting the duration of the short-circuiting pulses comprises increasing the duration of the short-circuiting pulses in the event that the determined current is below a threshold.

2. The method as claimed in claim 1, wherein adjusting the duration of the short-circuiting pulses comprises reducing the duration of the short-circuiting pulses in the event that the determined current is above a threshold.

3. The method as claimed in claim 2, further comprising:
determining a peak current in the motor during a short-circuit pulse; and
reducing the duration of the short-circuiting pulses in the event that the peak current is above a peak current threshold.

4. The method as claimed in claim 2, further comprising:
determining a DC link voltage of an inverter system driving the motor; and
reducing the duration of the short-circuiting pulses in the event that the DC link voltage is above a DC link voltage threshold.

5. The method as claimed in claim 1, further comprising:
determining a peak current in the motor during a short-circuit pulse; and
reducing the duration of the short-circuiting pulses in the event that the peak current is above a peak current threshold.

6. The method as claimed in claim 5, further comprising:
determining a DC link voltage of an inverter system driving the motor; and
reducing the duration of the short-circuiting pulses in the event that the DC link voltage is above a DC link voltage threshold.

7. The method as claimed in claim 1, further comprising:
determining a DC link voltage of an inverter system driving the motor; and
reducing the duration of the short-circuiting pulses in the event that the DC link voltage is above a DC link voltage threshold.

8. The method as claimed in claim 1, further comprising estimating a frequency of rotation of the motor by identifying peaks of the series of short circuit current pulses and using the identified peaks to estimate said frequency of rotation.

9. A controller comprising:
a first input for receiving information relating to a plurality of short-circuit current pulses from at least some windings of a motor; and
a control module configured to determine a current in the motor after one or more of the series of short-circuit current pulses has completed and to adjust the duration of the short-circuiting pulses depending on the determined current;
wherein the controller is further configured to increase the duration of the short-circuiting pulse in the event that the determined current is below a threshold.

10. The controller as claimed in claim 9, further comprising one or more current sensors configured to determine the current in the motor.

11. The controller as claimed in claim 9, wherein the controller is further configured to reduce the duration of the short-circuiting pulse in the event that the determined current is above a threshold.

12. The controller as claimed in claim 9, wherein the control module is further configured to identify peaks of the short circuit current pulses and to use the identified peaks to estimate a frequency of rotation of the motor.

13. The controller as claimed in claim 12, further comprising a frequency estimator configured to generate the estimate of the frequency of rotation of the motor.

14. A motor drive circuit comprising a controller as claimed in claim 9 and further comprising an inverter under the control of said controller.

15. A controller comprising:
a first input for receiving information relating to a plurality of short-circuit current pulses from at least some windings of a motor; and
a control module configured to determine a current in the motor after one or more of the series of short-circuit current pulses has completed and to adjust the duration of the short-circuiting pulses depending on the determined current;
wherein the controller is further configured to reduce the duration of the short-circuiting pulse in the event that the determined current is above a threshold.

* * * * *